(12) United States Patent
Liao

(10) Patent No.: US 12,142,933 B2
(45) Date of Patent: Nov. 12, 2024

(54) CONNECTING SHELL AND SUPPORT

(71) Applicant: Qianhai Junda (Shenzhen) Equity Investment Co., Ltd, Shenzhen (CN)

(72) Inventor: Zhuowen Liao, Shenzhen (CN)

(73) Assignee: Qianhai Junda (Shenzhen) Equity Investment Co., Ltd, Shenzhen (CN)

( * ) Notice: Subject to any disclaimer, the term of this patent is extended or adjusted under 35 U.S.C. 154(b) by 14 days.

(21) Appl. No.: 18/341,845

(22) Filed: Jun. 27, 2023

(65) Prior Publication Data
US 2024/0055895 A1   Feb. 15, 2024

Related U.S. Application Data

(63) Continuation of application No. PCT/CN2022/118348, filed on Sep. 13, 2022.

(30) Foreign Application Priority Data

Aug. 11, 2022   (CN) .......................... 202222120328.X

(51) Int. Cl.
   *H02J 50/00*      (2016.01)
   *H02J 50/10*      (2016.01)
   *G06F 1/16*       (2006.01)

(52) U.S. Cl.
   CPC ............ *H02J 50/005* (2020.01); *H02J 50/10* (2016.02); *G06F 1/1632* (2013.01)

(58) Field of Classification Search
   CPC .......... H02J 50/00; H02J 50/005; H02J 50/10; G06F 1/16; G06F 1/1632
   See application file for complete search history.

(56) References Cited

FOREIGN PATENT DOCUMENTS

| CN | 203896019 U | 10/2014 |
| --- | --- | --- |
| CN | 205039599 U | 2/2016 |
| CN | 205195364 U | 4/2016 |
| CN | 205620856 U | 10/2016 |
| CN | 108698545 A | 10/2018 |
| JP | 2001045129 A | 2/2001 |
| TW | M458729 U1 | 8/2013 |

OTHER PUBLICATIONS

Internation Search Report of PCT/CN2022/118348, Mailed Dec. 21, 2022.

*Primary Examiner* — Robert L Deberadinis

(57) ABSTRACT

Provided are a connecting shell (20) and a support, the connecting shell (20) comprises a shell body (21), a wireless receiver (22) and a first electric connecting member (23), the shell body (21) is detachably connected with a supporting base (10), the wireless receiver (22) and the first electric connecting member (23) are both connected to the shell body (21), and the first electric connecting member (23) is electrically connected with the wireless receiver (22), and used for being electrically connected with an electronic product connected to the shell body (21); and the wireless receiver (22) and a wireless transmitter (12) are capable of charging the electronic product electrically connected with the first electric connecting member (23) through electromagnetic induction. Therefore, no matter whether the electronic product is provided with a wireless charging module or not, wireless charging can be realized through the connecting shell (20).

10 Claims, 7 Drawing Sheets

CONNECTING SHELL AND SUPPORT

CROSS-REFERENCE TO RELATED APPLICATIONS

This application is a continuation of International Patent Application No. PCT/CN2022/118348 with a filing date of Sep. 13, 2022, designating the United States, now pending, and further claims priority to Chinese Patent Application No. 202222120328.X with a filing date of Aug. 11, 2022. The content of the aforementioned applications, including any intervening amendments thereto, are incorporated herein by reference.

TECHNICAL FIELD

The present application belongs to the technical field of charging supports, and particularly relates to a connecting shell and a support.

BACKGROUND OF THE PRESENT INVENTION

When electronic products such as mobile phones and tablet computers are charged, there are wireless and wired charging methods, the wired charging has a low degree of freedom in use due to limitation of data line connection, so that the wireless charging method is becoming more and more popular. However, for the electronic products, if the wireless charging is performed, the electronic products need to be equipped with a wireless receiving module first, which limits most electronic products in the market from the wireless charging, and brings more inconvenience to people's lives.

SUMMARY OF PRESENT INVENTION

The present application is intended to provide a connecting shell and a support, and aims at solving the technical problem that an electronic product without a wireless charging module cannot be wirelessly charged in the prior art.

In order to achieve the above object, technical solutions used in the present application are as follows.

In a first aspect, a connecting shell is provided, which is used for being connected with a supporting base, the supporting base being provided with a wireless transmitter, and comprises a shell body, a wireless receiver and a first electric connecting member, wherein the shell body is detachably connected with the supporting base, and used for being detachably connected with an electronic product, the wireless receiver and the first electric connecting member are both connected to the shell body, and the first electric connecting member is electrically connected with the wireless receiver, and used for being electrically connected with the electronic product connected to the shell body; and the wireless receiver and the wireless transmitter are capable of charging the electronic product electrically connected with the first electric connecting member through electromagnetic induction.

In one of embodiments in the first aspect, the first electric connecting member comprises at least one electric connecting contact point electrically connected with the wireless receiver, and the electric connecting contact point is used for abutting against and being electrically connected with an electric contact point of the electronic product.

In one of embodiments in the first aspect, the first electric connecting member comprises an electric connecting plug electrically connected with the wireless receiver, and the electric connecting plug is used for being plugged into an electric jack of the electronic product.

In one of embodiments in the first aspect, the connecting shell further comprises a first magnetic member connected to the shell body, and the shell body is capable of be magnetically attached to the supporting base through the first magnetic member.

In one of embodiments in the first aspect, the shell body is provided with a storing groove for sleeving the electronic product.

In one of embodiments in the first aspect, a groove wall on one side of the storing groove is provided with a connecting groove.

In a second aspect, a support is provided, which comprises a supporting base and the connecting shell above, wherein the supporting base comprises a supporting body and a wireless transmitter, and the wireless transmitter is connected to the supporting body, and used for supplying power to the wireless receiver through electromagnetic induction, so as to charge the electronic product electrically connected with the first electric connecting member.

In one of embodiments in the second aspect, the supporting base further comprises a second electric connecting member electrically connected to the wireless transmitter and a socket electrically connected to the second electric connecting member, the second electric connecting member is capable of being electrically connected with the first electric connecting member when the supporting body is connected to the shell body, and the socket is used for electrically plugging an external device, so that the electronic product electrically connected to the second electric connecting member transmits data with the external device.

In one of embodiments in the second aspect, the connecting shell further comprises a first magnetic member connected to the shell body, and the supporting base further comprises a second magnetic member capable of being magnetically attached to the first magnetic member.

In one of embodiments in the second aspect, the supporting body comprises a base portion, a rotating shaft portion, a supporting portion and a rotating portion, the base portion and the supporting portion are rotatably connected through the rotating shaft portion, the wireless transmitter and the second magnetic member are both connected to the supporting portion, the supporting portion is used for abutting against the shell body or the electronic product, the rotating portion is connected to the rotating shaft portion, the supporting portion is rotatably connected to the rotating portion, and a rotating axis of the rotating portion is perpendicular to a rotating axis of the rotating shaft portion.

Compared with the prior art, the present application has the technical effects that: the connecting shell realizes the connection between the electronic product and the supporting base provided with the wireless transmitter, and also realizes the electrical connection between the electronic product and the wireless receiver through the first electric connecting member, when the electronic product does not need to be charged, the connecting shell may be separated from the supporting base, and is always connected with the electronic product, when the electronic product needs to be charged, the connecting shell is connected with the supporting base, and at the moment, the wireless receiver generates a current through electromagnetic induction with the wireless transmitter and charges the electronic product. Therefore, no matter whether the electronic product is provided with the wireless charging module or not, wireless charging can be realized through the connecting shell, so that the limitation of the electronic product on the wireless charging function is eliminated, and the use is convenient.

DESCRIPTION OF THE DRAWINGS

In order to illustrate technical solutions in embodiments of the present application more clearly, the drawings which need to be used in describing the embodiments of the present application or the prior art will be briefly introduced hereinafter. Apparently, the drawings described hereinafter are only some embodiments of the present application, those of ordinary skills in the art may obtain other drawings according to these drawings without going through any creative work.

DESCRIPTION OF REFERENCE NUMERALS

Figure 1:
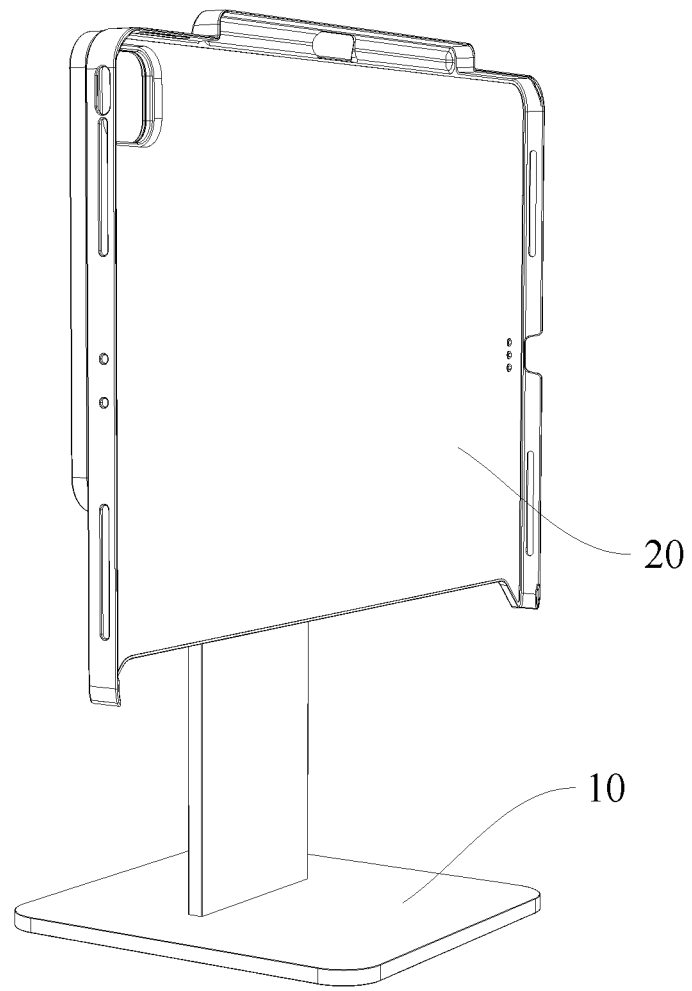
FIG. 1 is a stereoscopic structural diagram of a support provided by an embodiment of the present application.

10 refers to supporting base; 101 refers to second avoidance hole; 102 refers to through hole; 11 refers to supporting body; 111 refers to base portion; 112 refers to rotating shaft portion; 113 refers to supporting portion; 1131 refers to supporting plate; 1132 refers to covering plate; 114 refers to rotating portion; 1101 refers to supporting surface; 12 refers to wireless transmitter; 121 refers to wireless transmitting coil; 122 refers to transmitting end circuit board; 13 refers to second electric connecting member; 14 refers to socket; 15 refers to second magnetic member; 20 refers to connecting shell; 201 refers to storing groove; 202 refers to first avoidance hole; 203 refers to connecting groove; 204 refers to third avoidance hole; 21 refers to shell body; 211 refers to shell bottom portion; 212 refers to shell side portion; 213 refers to covering portion; 22 refers to wireless receiver; 221 refers to wireless receiving coil; 222 refers to receiving end circuit board; 23 refers to first electric connecting member; 231 refers to first electric connecting contact point; 232 refers to electric connecting plug; 24 refers to first magnetic member; and 25 refers to connecting supporting foot.

DETAILED DESCRIPTION OF PREFERRED EMBODIMENTS

Embodiments of the present application will be described in detail hereinafter. Examples of the embodiments are shown in the drawings. The same or similar reference numerals throughout the drawings denote the same or similar elements or elements having the same or similar functions. The embodiments described hereinafter with reference to the drawings are exemplary and are intended to explain the present application, but should not be construed as limiting the present application.

In the description of the present application, it should be understood that, the orientation or position relationship indicated by the terms "length", "width", "up", "down", "vertical", "horizontal", "top", "bottom", "inside", "outside", and the like is based on the orientation or position relationship shown in the drawings, it is only for the convenience of description of the present application and simplification of the description, and it is not to indicate or imply that the indicated device or element must have a specific orientation, and be constructed and operated in a specific orientation. Therefore, the terms should not be understood as limiting the present application.

Moreover, the terms "first" and "second" are only used for descriptive purposes, but cannot be understood as indicating or implying relative importance, or implicitly indicating the number of indicated technical features. Therefore, the feature defined by "first" and "second" may explicitly or implicitly include one or more of the features. In the description of the present application, the meaning of "multiple" is two or more than two, unless otherwise specifically defined.

In the present application, the terms "installation", "connected", "connection", "fixation", and the like should be understood in broad sense unless otherwise specified and defined. For example, they may be fixed connection, removable connection or integrated connection; may be mechanical connection or electrical connection; and may be direct connection, or indirect connection through an intermediate medium, and connection inside two components, or interaction relation of two elements. The specific meaning of the above terms in the present application can be understood in a specific case by those of ordinary skills in the art.

To make the objects, the technical solutions, and the advantages of the present application clearer, the present application is further described in detail hereinafter with reference to the drawings and the embodiments.

The embodiment provides a connecting shell 20 and a support, the connecting shell 20 is used for being connected with an electronic product, and the support is used for supporting the electronic product connected with the connecting shell 20, wherein the electronic product may be a mobile phone, a tablet computer, an electronic reader, and other terminals. The support is capable of supporting, charging and transmitting data to the electronic product through the connecting shell 20. The electronic product is provided with an electric connecting base for charging or data transmission, and the electric connecting base may be provided with an electric jack for plugging an external plug or an electric contact point for electrical contact with the external plug. In the embodiment, the electronic product is described by taking the tablet computer with the electric connecting base being the electric contact point as an example.

With reference to FIG. 1, the support comprises a supporting base 10 and the connecting shell 20.

Figure 2:
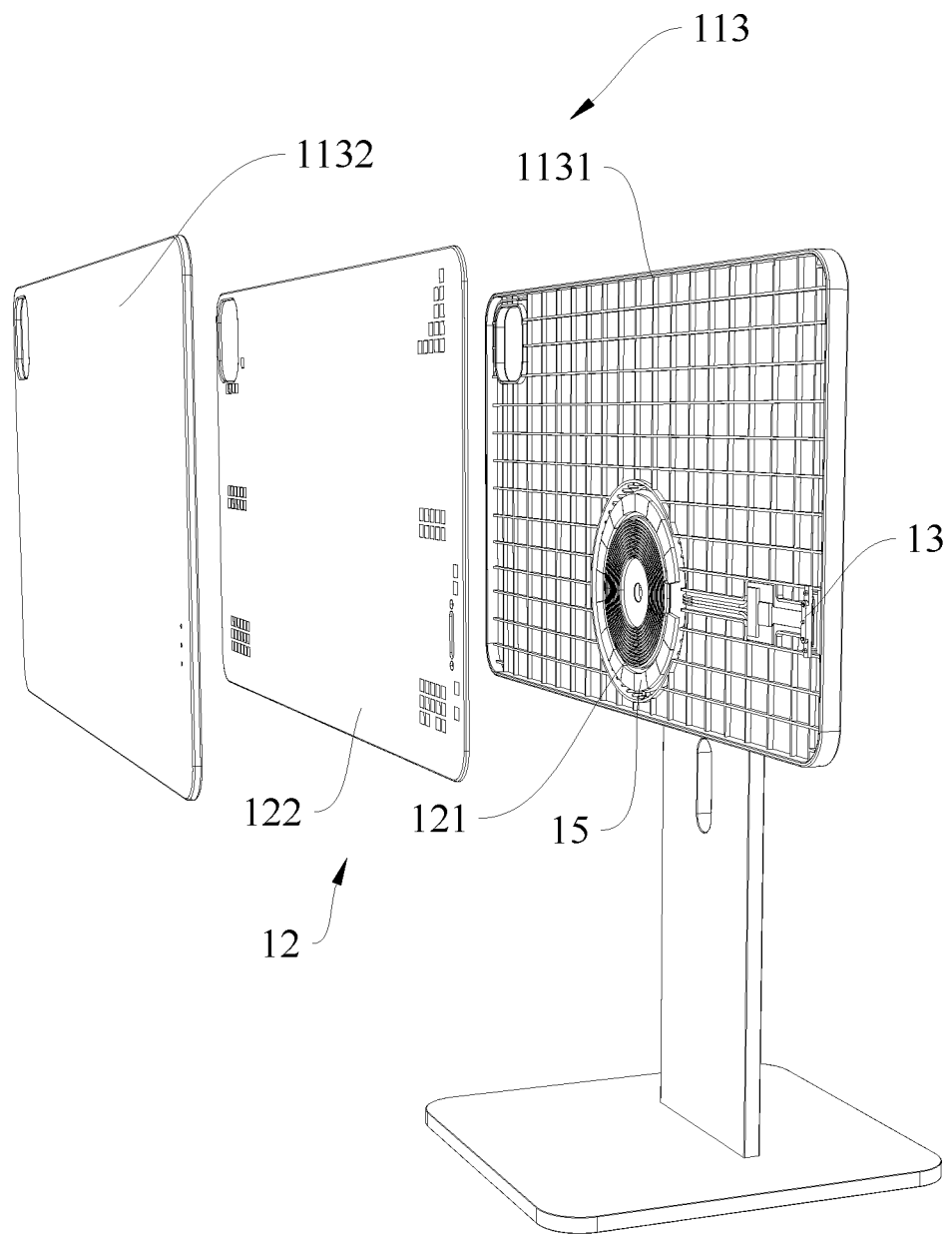
FIG. 2 is an exploded view of a supporting base in FIG. 1.

With reference to FIG. 2, the supporting base 10 comprises a supporting body 11 and a wireless transmitter 12. The supporting body 11 is used for being supported on the ground or a desktop, and the wireless transmitter 12 is connected to the supporting body 11. The wireless transmitter 12 comprises a wireless transmitting coil 121 and a transmitting end circuit board 122 electrically connected with the wireless transmitting coil 121, and the wireless charging coil is capable of generating an induced magnetic field through electromagnetic induction after being electrified. The wireless transmitter 12 may be electrically connected with an external power supply through an external lead to supply power to the wireless transmitter 12, and the supporting body 11 may also be provided with a storage battery as a power supply to supply power to the wireless transmitter 12.

Optionally, the supporting body 11 may be detachably connected with the electronic product directly. At the moment, for an electronic product provided with a wireless charging module, the wireless transmitter 12 is capable of wirelessly charging the electronic product connected to the supporting body 11 directly.

Figure 3:
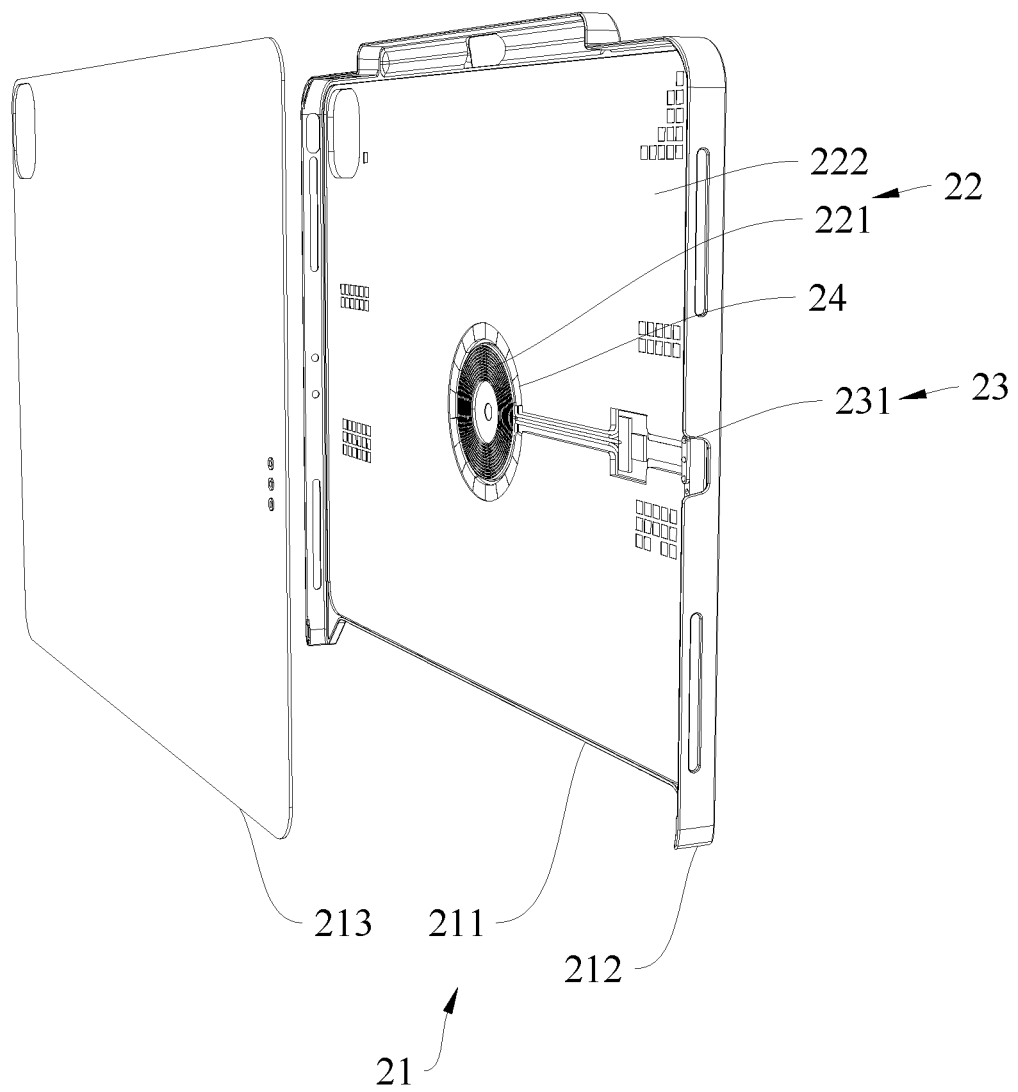
FIG. 3 is an exploded view of a connecting shell in FIG. 1.

With reference to FIG. 3, the connecting shell 20 is used for being detachably connected with the electronic product. The connecting shell 20 comprises a shell body 21, a wireless receiver 22 and a first electric connecting member 23. The shell body 21 is used for being detachably connected with the electronic product, such as clamping, sleeving, plugging, holding or magnetic connection. The shell body 21 is detachably connected with the supporting body 11 to realize connection between the electronic product and the supporting base 10, so as to support the electrical product by the supporting base 10. The wireless receiver 22 and the first electric connecting member 23 are both connected to the shell body 21, and the first electric connecting member 23 is used for being electrically connected with the electronic product connected to the shell body 21. When the electronic product is connected with the shell body 21, a position of the first electric connecting member 23 is opposite to the electric contact point of the electronic product, and may contact with the electric contact point of the electronic product, so that the first electric connecting member 23 is electrically connected with the electronic product. The first electric connecting member 23 is electrically connected with the wireless receiver 22, and when the first electric connecting member 23 is electrically connected with the electronic product, the wireless receiver 22 is electrically connected with the first electric connecting member 23. The wireless receiver 22 and the wireless transmitter 12 are capable of charging the electronic product electrically connected with the first electric connecting member 23 through electromagnetic induction. The wireless receiver 22 comprises a wireless receiving coil 221 and a receiving end circuit board 222 electrically connected with the wireless receiving coil 221, and the wireless receiving coil 221 is capable of generating a current through electromagnetic induction in an induced magnetic field generated by the wireless transmitter 12, thus charging the electronic product electrically connected with the wireless receiver 22.

The support realizes the connection between the electronic product and the supporting base 10 through the connecting shell 20, and also realizes the electrical connection between the electronic product and the wireless receiver 22 through the first electric connecting member 23, when the electronic product does not need to be charged, the connecting shell 20 may be separated from the supporting base 10, and is always connected with the electronic product, when the electronic product needs to be charged, the connecting shell 20 is connected with the supporting base 10, and at the moment, the wireless receiver 22 generates a current through electromagnetic induction with the wireless transmitter 12 and charges the electronic product. Meanwhile, the supporting base 10 supports the electronic product, and may be used as a daily supporting frame. No matter whether the electronic product is provided with the wireless charging module or not, wireless charging can be realized through the support, so that the limitation of the electronic product on the wireless charging function is eliminated, and the use is convenient.

In one embodiment, with reference to FIG. 3, the first electric connecting member 23 comprises at least one electric connecting contact point electrically connected with the wireless receiver 22, the electric connecting contact point may be named as a first electric connecting contact point 231, and the first electric connecting contact point 231 is used for abutting against and being electrically connected with an electric contact point of the electronic product. A number of the first electric connecting contact points 231 is the same as that of the electric contact points of the electronic product, and each first electric connecting contact point 231 corresponds to a position of each electric contact point on the electronic product. When the electronic product is the tablet computer with three electric contact points, three first electric connecting contact points 231 are also provided, and the three first electric connecting contact points 231 are arranged at equal intervals along a straight line. When in use, electrical contact between the first electric connecting contact point 231 and the electric contact point on the electronic product may be realized only by connecting the electronic product with the shell body 21.

Figure 4:
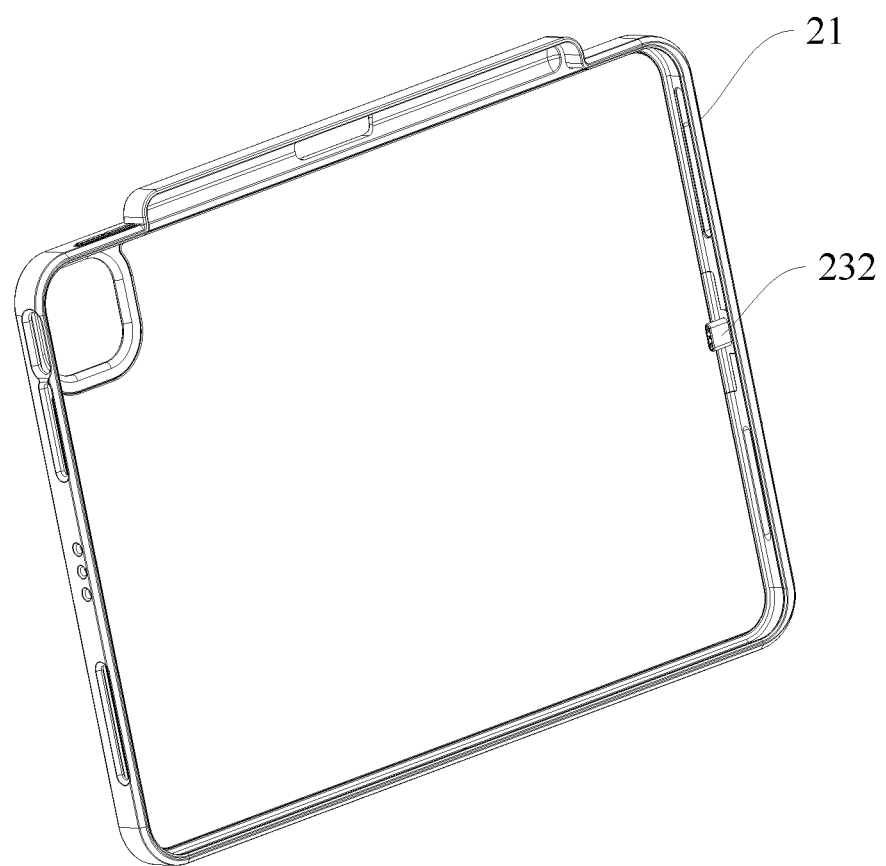
FIG. 4 is a stereoscopic structural diagram of the connecting shell provided by the embodiment of the present application in another embodiment.
Figure 5:
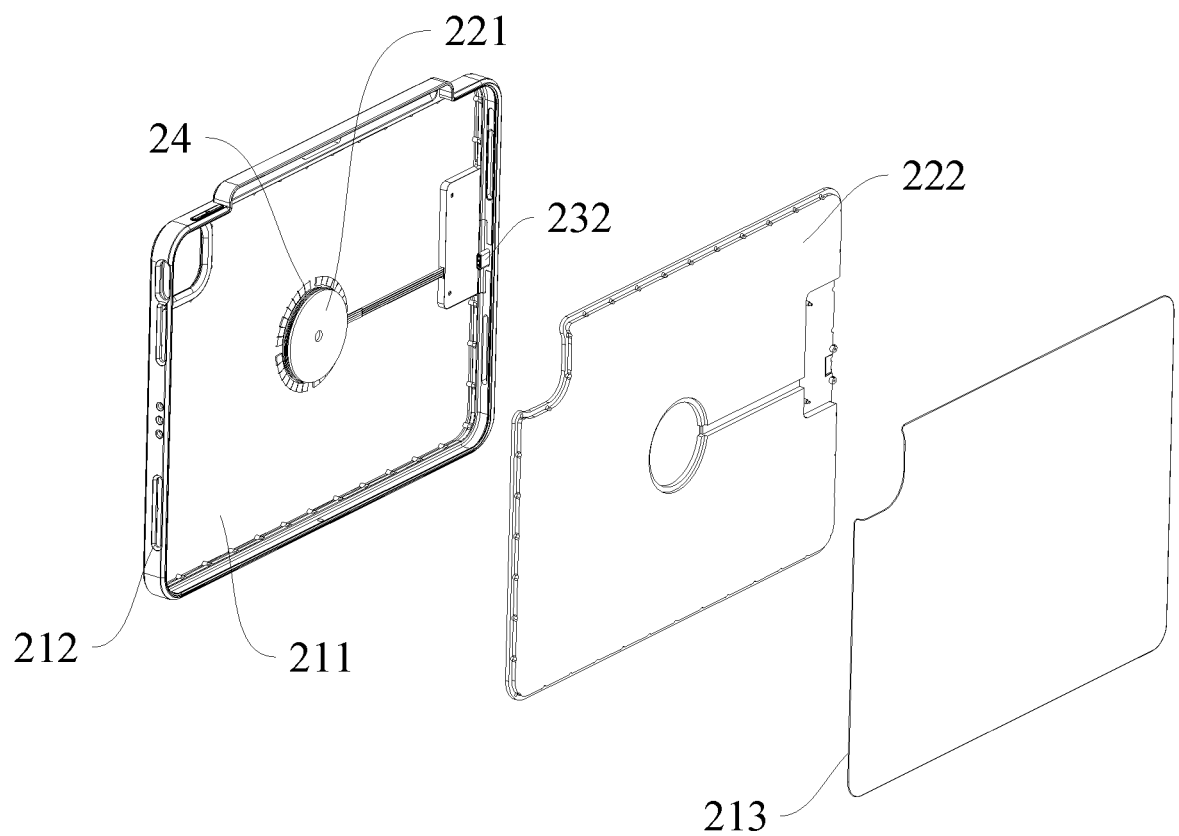
FIG. 5 is an exploded view of the connecting shell in FIG. 4.

In another embodiment, with reference to FIG. 4 and FIG. 5, when the electronic product is provided with an electric jack, the first electric connecting member 23 comprises an electric connecting plug 232 electrically connected with the wireless receiver 22, and the electric connecting plug 232 is used for being plugged into the electric jack of the electronic product. When in use, the electric connecting plug 232 may be plugged into and matched with the electric jack of the electronic product first, and then the electronic product is connected with the shell body 21. The electric connecting plug 232 may be a high-efficiency plug to realize high-efficiency charging and data transmission through the supporting base 10.

With reference to FIG. 3, the supporting base 10 further comprises a second electric connecting member 13 electrically connected to the wireless transmitter 12, and the second electric connecting member 13 is used for being electrically connected with the electronic product detachably connected to the supporting body 11. That is to say, when the electronic product is directly connected with the supporting body 11, the second electric connecting member 13 is electrically connected with the electronic product.

In the embodiment, the second electric connecting member 13 may further comprise at least one electric connecting contact point, and the electric connecting contact point may be named as a second electric connecting contact point. A number of the second electric connecting contact points is the same as that of the electric contact points of the electronic product, and each second electric connecting contact point corresponds to the position of each electric contact point on the electronic product. When the electronic product is the tablet computer with three electric contact points, three second electric connecting contact points are also provided, and the three second electric connecting contact points are arranged at equal intervals along a straight line.

When the electronic product is directly connected with the supporting body 11, the second electric connecting contact point electrically contacts with the electric contact point of the electronic product, so that the external device is capable of transmitting data with the electronic product through the second electric connecting member 13.

When the electronic product is connected with the shell body 21 and the shell body 21 is connected with the supporting body 11, the second electric connecting member 13 contacts with and is electrically connected with the first electric connecting member 23, so that the external device transmits data with the electronic product connected with the shell body 21 through the second electric connecting member 13 and the first electric connecting member 23 sequentially.

Figure 6:
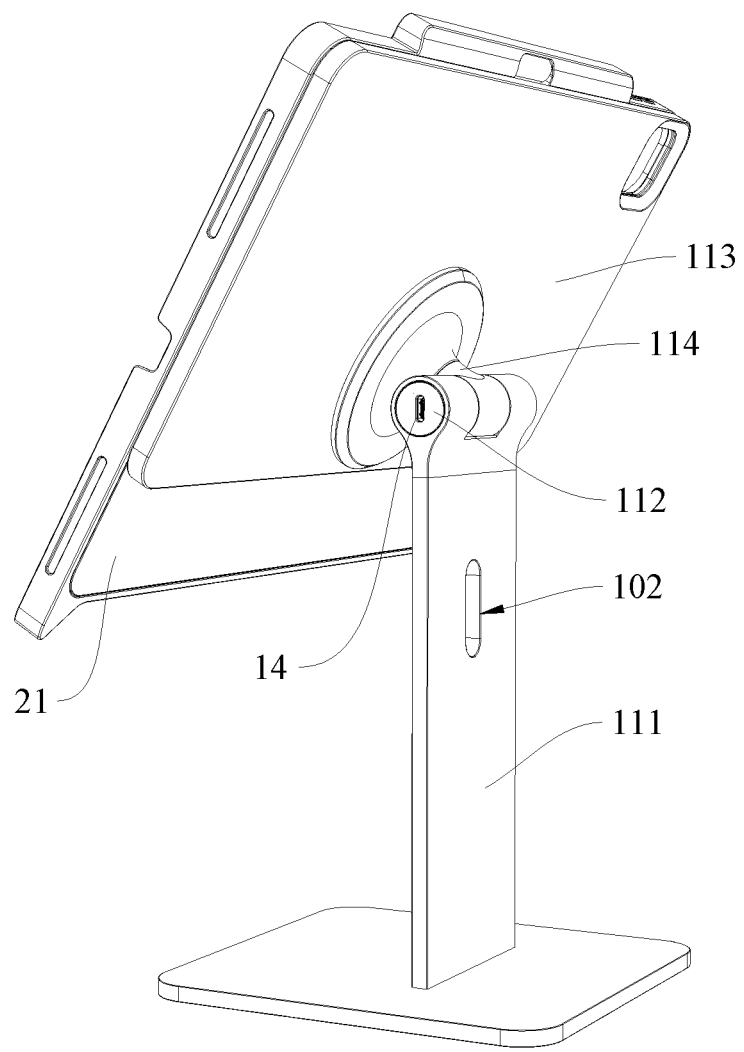
FIG. 6 is a stereoscopic structural diagram of the support in FIG. 1 from another perspective.

In order to realize electrical connection between the supporting base 10 and the external device, with reference to FIG. 6, the supporting base 10 further comprises a socket 14, and the socket 14 is electrically connected to the second electric connecting member 13, and used for electrically plugging the external device. When in use, the external plug of the external device may be electrically plugged into the socket 14, so that the electronic product electrically connected to the second electric connecting member 13 transmits data with the external device, and when the external plug of the external device is plugged into the socket 14, the external device is electrically connected with the electronic product through the second electric connecting member 13 or through the second electric connecting member 13 and the first electric connecting member 23, thus transmitting data to the electronic product. The external device may be a keyboard, and after a plug of the keyboard is plugged into the socket 14, the keyboard is capable of transmitting data to the electronic product.

The socket 14 may be one or more of a USB-Type-C interface base, a USB-Type-B interface base, a TF card interface base, an audio interface base and a HDMI interface base.

In the embodiment, with reference to FIG. 3, the shell body 21 and the supporting body 11 may be detachably connected through magnetic attachment. Specifically, the connecting shell 20 further comprises a first magnetic member 24, the supporting base 10 further comprises a second magnetic member 15 magnetically attached to the first magnetic member 24, and the shell body 21 is capable of being detachably connected to the supporting body 11 through magnetic attachment between the first magnetic member 24 and the second magnetic member 15. The first magnetic member 24 is a permanent magnet, and the second magnetic member 15 may be a permanent magnet or an electromagnet. The electronic product and the connecting shell 20 may be magnetically attached through the first magnetic member 24, thus realizing detachable connection between the electronic product and the connecting shell 20, and the electronic product and the supporting base 10 may be magnetically attached through the second magnetic member 15, thus realizing detachable connection between the electronic product and the supporting base 10.

With reference to FIG. 6, the supporting body 11 comprises a base portion 111, a rotating shaft portion 112, a supporting portion 113 and a rotating portion 114.

The base portion 111 is used for being supported on the ground or a desktop, and comprises a horizontally arranged bottom plate and an extending plate connected to the bottom plate and extending upwardly. The base portion 111 is provided with a through hole 102 to facilitate holding.

The base portion 111 and the supporting portion 113 are rotatably connected through the rotating shaft portion 112, wherein a top portion of the extending plate is provided with a connecting hole, the connecting hole is opened in a horizontal direction, the rotating shaft portion 112 is rotatably connected in the connecting hole, and the rotating shaft portion 112 is capable of rotating along a central axis of the connecting hole in the connecting hole. At the moment, a rotating axis of the rotating shaft portion 112 also extends in the horizontal direction. The socket 14 is connected with the rotating shaft portion 112.

The supporting portion 113 is connected with the rotating shaft portion 112. At the moment, a user can rotate the electronic product up and down through relative rotation between the base portion 111 and the rotating shaft portion 112, so that the electronic product faces the user to facilitate operation. The supporting portion 113 comprises a supporting plate 1131 and a covering plate 1132 connected to the supporting plate 1131, the wireless transmitter 12 and the second magnetic member 15 are both arranged between the supporting plate 1131 and the covering plate 1132, and the covering plate 1132 is used for abutting against the shell body 21 or the electronic product. The transmitting end circuit board 122 may also be arranged between the supporting plate 1131 and the covering plate 1132.

The supporting portion 113 may be connected with the rotating shaft portion 112 through the rotating portion 114. The rotating portion 114 is fixedly connected with the rotating shaft portion 112, and the supporting portion 113 is rotatably connected to the rotating portion 114. Specifically, an extending direction of the rotating portion 114 is perpendicular to an extending direction of the rotating axis of the rotating shaft portion 112, and the supporting portion 113 is sleeved at an extending end of the rotating portion 114, and is capable of rotating around a central axis of the rotating portion 114, which means that, a rotating axis of the rotating portion 114 is perpendicular to the rotating axis of the rotating shaft portion 112. In this way, the user can realize left-right rotation of the electronic product through relative rotation between the supporting portion 113 and the rotating portion 114.

The wireless transmitter 12 and the second magnetic member 15 are both connected to the supporting portion 113, and the supporting portion 113 is used for abutting against the shell body 21 or the electronic product. At the moment, the wireless transmitter 12 is closer to the electronic product, so as to facilitate charging the electronic product, and the second magnetic member 15 is closer to the first magnetic member 24, so as to improve magnetic attraction between the shell body 21 and the supporting body 11.

In the embodiment, the shell body 21 may be sleeved outside the electronic product, so as to realize stable connection between the shell body 21 and the electronic product. With reference to FIG. 5, specifically, the shell body 21 is provided with a storing groove 201 for sleeving the electronic product. The storing groove 201 is adapted to the electronic product, and when the electronic product is placed in the storing groove 201, a groove bottom of the storing groove 201 abuts against a back surface of the electronic product, and a groove wall of the storing groove 201 is held on a side surface of the electronic product.

With reference to FIG. 3, the shell body 21 comprises a shell bottom portion 211, a shell side portion 212 and a covering portion 213. The shell side portion 212 is arranged around an edge of the shell bottom portion 211 and used for wrapping an edge of electronic product, the covering portion 213 is connected to the shell bottom portion 211 and forms a groove bottom surface of the storing groove 201, and the wireless receiver 22 is arranged between the covering portion 213 and the shell bottom portion 211 to improve an appearance of the connecting shell 20. The receiving end circuit board 222 may also be arranged between the covering portion 213 and the shell bottom portion 211.

The electronic product such as the tablet computer is generally provided with a camera. Accordingly, with reference to FIG. 7, the shell body 21 is provided with a first avoidance hole 202 for avoiding the camera of the electronic product. When the electronic product is accommodated in the storing groove 201, the first avoidance hole 202 avoids light emitted to the camera, so that the camera of the electronic product collects an image.

Figure 7:
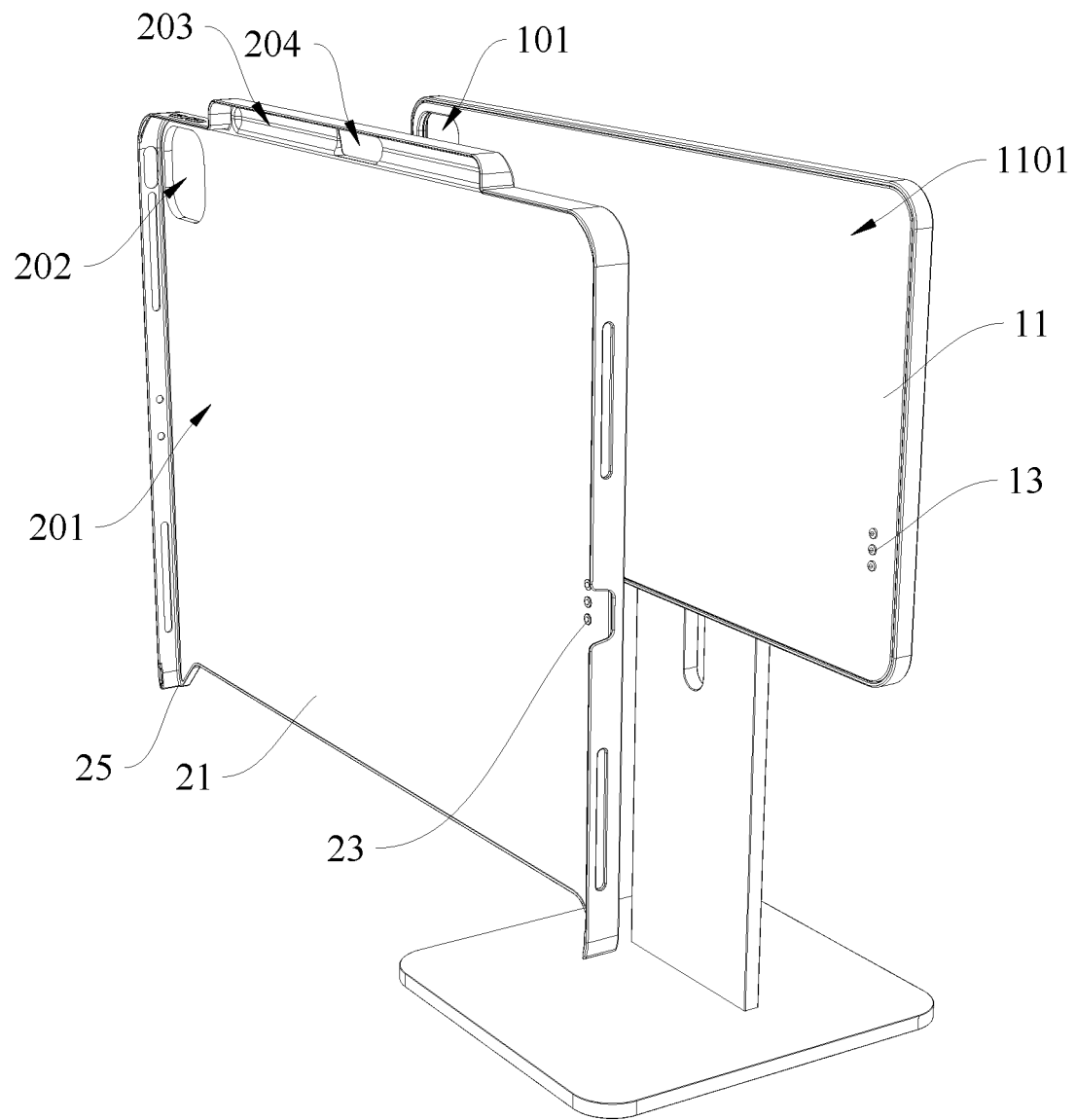
FIG. 7 is an exploded view of the support in FIG. 1.

With reference to FIG. 7, the supporting body 11 is provided with a supporting surface 1101 for abutting against the electronic product or the shell body 21, and an area of the supporting surface 1101 may be set to be equivalent to an area of the shell body 21, so as to increase a contact area between the supporting surface 1101 and the shell body 21, thus improving connection stability of the shell body 21. Corresponding to the first avoidance hole 202, the supporting surface 1101 is provided with a second avoidance hole 101. When the shell body 21 is connected with the supporting body 11, the first avoidance hole 202 is opposite to the second avoidance hole 101, and has the same size as the second avoidance hole 101.

When the electronic product is the tablet computer, the tablet computer may need to be plugged and matched with a corresponding connecting keyboard. Accordingly, with reference to FIG. 7, the groove wall on one side of the storing groove 201 is provided with an opening, so that the electronic product is directly connected with a mounting portion on the connecting keyboard. The shell body 21 is provided with a connecting supporting foot 25 at the opening, and the connecting supporting foot 25 may be used for being plugged and matched with the connecting keyboard.

The tablet computer is often equipped with a stylus. In the embodiment, with reference to FIG. 7, the groove wall on one side of the storing groove 201 is provided with a connecting groove 203, and the connecting groove 203 may be used for storing the stylus, so as to prevent the stylus from being lost. Meanwhile, in order to facilitate use of the stylus, a groove wall of the connecting groove 203 is provided with a third avoidance hole 204. The user may eject the stylus from the connecting groove 203 through the third avoidance hole 204.

The above are only the preferred embodiments of the present application, and only describe in detail the technical principle of the present application. These descriptions are only for the purpose of explaining the principle of the present application, and cannot be interpreted as limiting the scope of protection of the present application in any way. Based on the explanation herein, any modification, equivalent substitution and improvement made within the spirit and principle of the present application, and other specific embodiments of the present application that may be thought of by those skilled in the art without going through any creative work, should be included in the scope of protection of the present application.

I claim:

1. A connecting shell, used for being connected with a supporting base, the supporting base being provided with a wireless transmitter, and comprising a shell body, a wireless receiver and a first electric connecting member, wherein the shell body is detachably connected with the supporting base, and used for being detachably connected with an electronic product, the wireless receiver and the first electric connecting member are both connected to the shell body, and the first electric connecting member is electrically connected with the wireless receiver, and used for being electrically connected with the electronic product connected to the shell body; and the wireless receiver and the wireless transmitter are capable of charging the electronic product electrically connected with the first electric connecting member through electromagnetic induction.

2. The connecting shell according to claim 1, wherein the first electric connecting member comprises at least one electric connecting contact point electrically connected with the wireless receiver, and the electric connecting contact point is used for abutting against and being electrically connected with an electric contact point of the electronic product.

3. The connecting shell according to claim 1, wherein the first electric connecting member comprises an electric connecting plug electrically connected with the wireless receiver, and the electric connecting plug is used for being plugged into an electric jack of the electronic product.

4. The connecting shell according to claim 1, wherein the connecting shell further comprises a first magnetic member connected to the shell body, and the shell body is capable of be magnetically attached to the supporting base through the first magnetic member.

5. The connecting shell according to claim 1, wherein the shell body is provided with a storing groove for sleeving the electronic product.

6. The connecting shell according to claim 5, wherein a groove wall on one side of the storing groove is provided with a connecting groove.

7. A support, comprising a supporting base and the connecting shell according to claim 1, wherein the supporting base comprises a supporting body and a wireless transmitter, and the wireless transmitter is connected to the supporting body, and used for supplying power to the wireless receiver through electromagnetic induction, so as to charge the electronic product electrically connected with the first electric connecting member.

8. The support according to claim 7, wherein the supporting base further comprises a second electric connecting member electrically connected to the wireless transmitter and a socket electrically connected to the second electric connecting member, the second electric connecting member is capable of being electrically connected with the first electric connecting member when the supporting body is connected to the shell body, and the socket is used for electrically plugging an external device, so that the electronic product electrically connected to the second electric connecting member transmits data with the external device.

9. The support according to claim 7, wherein the connecting shell further comprises a first magnetic member connected to the shell body, and the supporting base further comprises a second magnetic member capable of being magnetically attached to the first magnetic member.

10. The support according to claim 9, wherein the supporting body comprises a base portion, a rotating shaft portion, a supporting portion and a rotating portion, the base portion and the supporting portion are rotatably connected through the rotating shaft portion, the wireless transmitter and the second magnetic member are both connected to the supporting portion, the supporting portion is used for abutting against the shell body or the electronic product, the rotating portion is connected to the rotating shaft portion, the supporting portion is rotatably connected to the rotating portion, and a rotating axis of the rotating portion is perpendicular to a rotating axis of the rotating shaft portion.

* * * * *